United States Patent [19]

Barnard

[11] Patent Number: 4,846,973
[45] Date of Patent: Jul. 11, 1989

[54] MEMBRANE TUBE FILTER DEVICE AND DISC SUPPORTS AND TENSION MEMBERS

[75] Inventor: Johan P. Barnard, Wellington, South Africa

[73] Assignee: Bintech (Proprietary) Limited, Paarl, South Africa

[21] Appl. No.: 161,038

[22] Filed: Feb. 26, 1988

[30] Foreign Application Priority Data

Feb. 27, 1987 [ZA] South Africa ............... 87/1429

[51] Int. Cl.⁴ .................. B01D 29/14; B01D 29/34
[52] U.S. Cl. ................. 210/323.2; 210/489; 210/336
[58] Field of Search .............. 210/321.78, 321.79, 210/321.8, 321.87, 321.88, 321.89, 232, 323.2, 488, 489, 336

[56] References Cited

U.S. PATENT DOCUMENTS

| | | | |
|---|---|---|---|
| 3,701,431 | 10/1972 | Brown et al. | 210/321.87 |
| 3,707,234 | 12/1972 | Salemi | 210/321.87 |
| 4,605,500 | 8/1986 | Takemura et al. | 210/321.87 |
| 4,636,307 | 1/1987 | Inoue et al. | 210/321.87 |
| 4,668,401 | 5/1987 | Okumura et al. | 210/321.87 |
| 4,707,261 | 11/1987 | Ikeyama et al. | 210/321.8 |

FOREIGN PATENT DOCUMENTS 52-56081 9/1977 Japan ............... 210/321.89

Primary Examiner—Richard V. Fisher
Assistant Examiner—Cynthia L. Nessle
Attorney, Agent, or Firm—Larson and Taylor

[57] ABSTRACT

A liquid flow device includes filter tubes which act as reverse osmosis tubes, ultrafiltration tubes or microfiltration tubes. The device also includes a stack of discs having apertures defining a plurality of elongated passages; an end disc provided at each end of the stack of discs; and a membrane tube provided in each elongated passage and projecting at opposite open ends through and beyond the end discs. A liquid inlet feeds liquid into the interior of at least one membrane tube; and a liquid outlet withdraws liquid from inside the membrane tubes. Tubular interconnector members are provided at both open ends of at least two of the membrane tubes for interconnecting the open ends of the various membrane tubes at both ends. At least one elongated tension member extends parallel to the elongated passages defined by the stack of discs; and means is provided for attaching each tension member to the discs, said attaching means cooperating with each elongated tension member for acting onto the end discs for forcing all discs between the end discs tightly together without the provision of an outer housing.

7 Claims, 6 Drawing Sheets

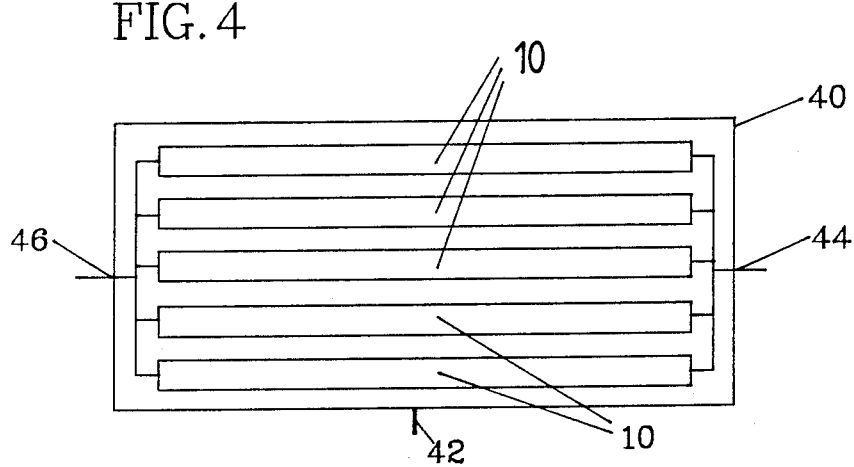
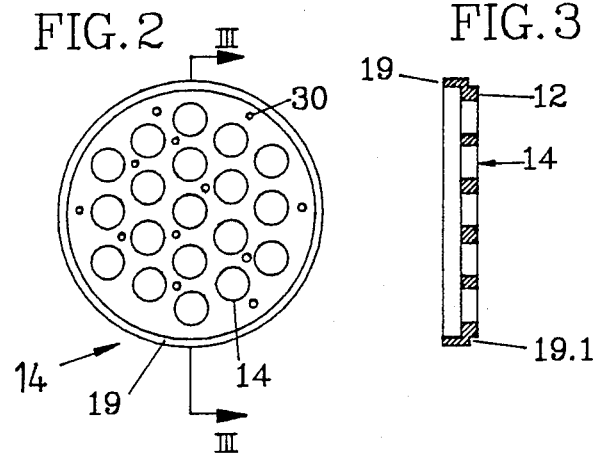

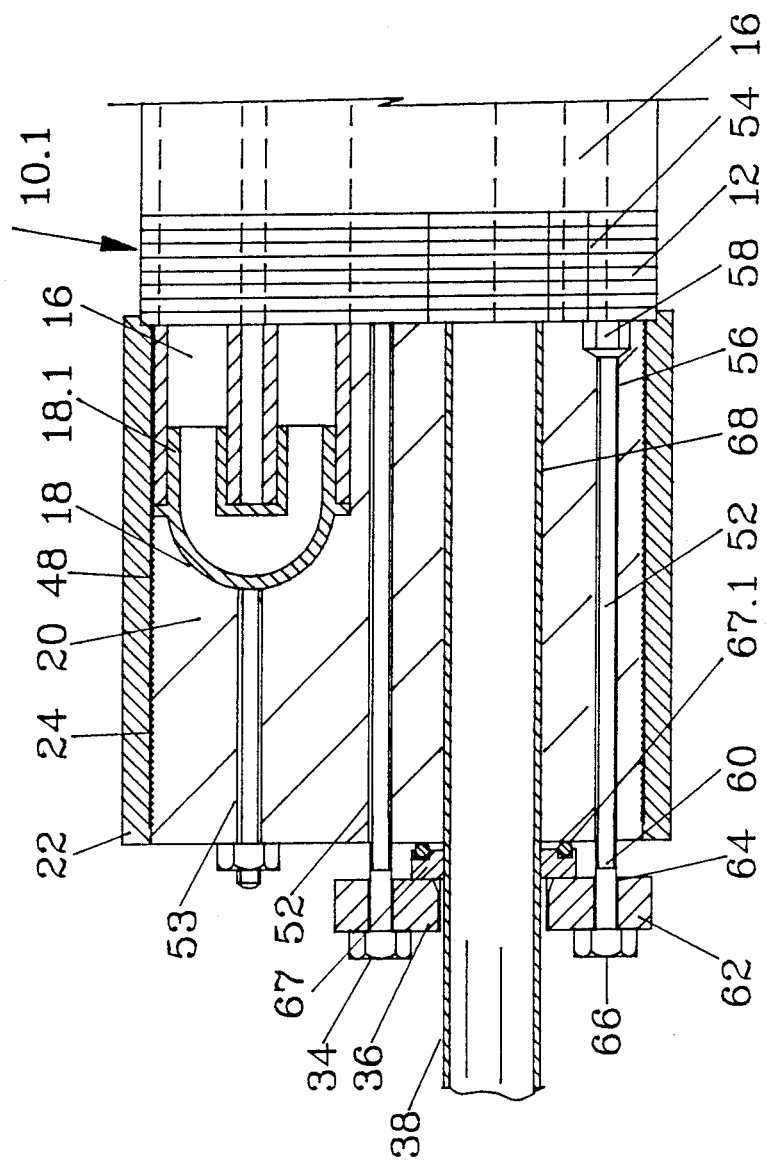

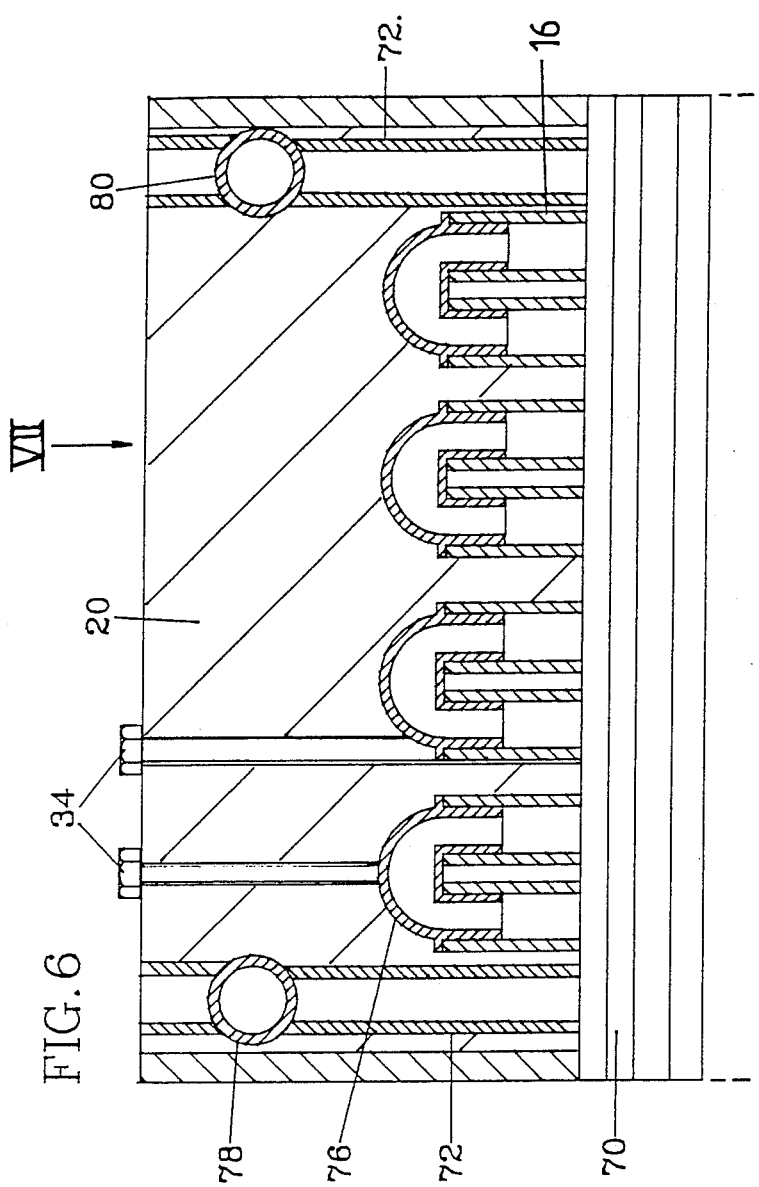

MEMBRANE TUBE FILTER DEVICE AND DISC SUPPORTS AND TENSION MEMBERS

FIELD OF INVENTION

The present invention relates to liquid flow devices.

The invention relates in particular to liquid flow devices including filter tubes, which may act as reverse osmosis tubes, ultrafiltration tubes or microfiltration tubes.

BACKGROUND TO INVENTION

In liquid flow devices of the type mentioned all or a number of the filter tubes generally are interconnected so as to provide an elongated tubular flow channel (or channels) for receiving liquid to be treated by filtration, reverse osmosis action or microfiltration. The liquid is introduced at one end of the tubular flow channel (or by way of a manifold into a number of ends of different tubular flow channels) and flows along the tubular flow channel or channels to pass out at the opposite end of each flow channel. Liquid, which moves through the walls of the filter tubes, is withdrawn from the space surrounding the filter tubes.

The walls of the tubes normally are made of membranes of fibrous material, this material being relatively weak. The tubes generally are supported by means of a series of packed discs with holes for receiving the tubes. The discs in turn are supported in an outer tubular housing, eg. made of metal such as aluminium.

This outer housing is relatively expensive and it is cumbersome to replace the tubes in the housing, when they have served their useful life or have become blocked or are otherwise defective.

It is an object of the invention to suggest a liquid flow device, which will assist in overcoming this problem.

SUMMARY OF INVENTION

According to the invention, a liquid flow device includes (a) a stack of discs having apertures, which are in alignment so as to define a plurality of elongated passages;

(b) an end disc provided at each end of the stack of discs, each end disc having apertures which respectively are in alignment with the elongated passages of the stack of discs;

(c) a membrane tube having a membrane wall provided in each elongated passage and projecting at opposite open ends through and beyond the end discs;

(d) a liquid inlet to feed liquid into the interior of at least one membrane tube;

(e) a liquid outlet for withdrawing liquid from inside the membrane tubes;

(f) separating means separating the discs from each other so as to provide a flow gap between adjacent discs for allowing liquid, which has passed through the membrane wall of the membrane tubes, to flow out between the discs;

(h) tubular interconnector members provided at both open ends of at least two of the membrane tubes for interconnecting the open ends of membrane tubes at both ends so as to allow series flow to take place from the open end of one membrane tube into the end of at least one other membrane tube at the ends via the tubular interconnector members;

(i) at least one elongated tension member extending parallel to the elongated passages defined by the stack of discs; and (j) means for attaching each tension member to the discs, said attaching means cooperating with each elongated tension member for acting onto the end discs for forcing all discs between the end discs tightly together without the provision of an outer housing.

The device may further include (a) a tubular casing provided at each end of the membrane tubes;

(b) a resin casting provided in situ in each casing at each end of the membrane tubes and extending from the respective end disc to encapsulate and seal both the tubular interconnector members and the exposed surfaces of the ends of the membrane tubes extending beyond the end disc and associated with the tubular interconnector members so as to maintain the tubular interconnector members in fluidtight relationship with the interconnected ends of the membrane tubes, and so as to seal the U-shaped tubular members in fluidtight relationship relative to the stack of discs and the membrane tubes in the casing; and (c) locking means for firmly locking each resin casting in place relative to its tubular casing.

BRIEF DESCRIPTION OF DRAWINGS

The invention will now be described by way of example with reference to the accompanying schematic drawings.

In the drawings there is shown in

FIG. 2 an end view of a disc seen along arrow II in FIG. 1 but on a slightly smaller scale;

FIG. 3 a sectional view of the disc seen along arrows III—III in FIG. 2;

FIG. 4 on a smaller scale, a plan view of a filter arrangement including a number of liquid flow devices as illustrated in FIG. 1;

FIG. 5 a sectional side view corresponding to FIG. 1 but showing one end of a second embodiment of a liquid flow device in accordance with the invention;

FIG. 6 a sectional side view showing one end of a third embodiment of a liquid flow device in accordance with the invention with one type of manifold connection for a liquid flow device in accordance with the invention;

DETAILED DESCRIPTION OF DRAWINGS

Figure 1:
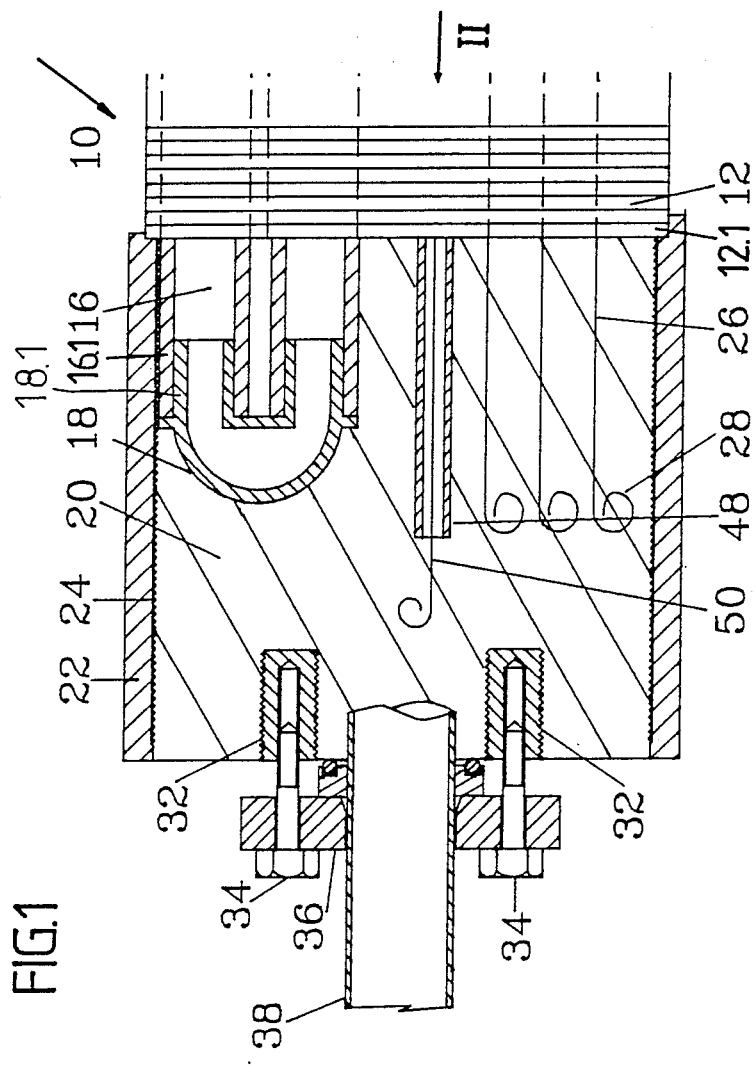
FIG. 1 a sectional side view of one end of one embodiment of a liquid flow device in accordance with the invention.

Referring to FIGS. 1, 2 and 3 one end of a first embodiment of a liquid flow device 10 in accordance with the invention is illustrated. The opposite end, which is not shown, is identical.

The liquid flow device 10 includes a number of discs 12 which are tightly stacked together and at both ends have an end disc 12.1. The discs 12 and the two discs 12.1 have apertures 14 (see FIGS. 2 and 3) for receiving membrane tubes 16. The ends of the tubes 16 are interconnected by means of U-shaped tubular interconnectors 18. For the sake of clarity, only one connector 18 and its associated tubes 16 are shown. The ends 18.1 of the U-connectors tightly fit into the open ends 16.1 of the tubes 16.

As shown in FIG. 3 each disc 12 has a circumferential ridge 19, which is adapted to abut tightly into a corresponding groove 19.1 of an adjacent disc as to provide a flow gap between adjacent discs 12. The liquid passing through the membrane tubes 16 flows into this gap.

Referring again to FIG. 1, the U-connectors 18 and the ends 16.1 of the tubes 16 are embedded in an in-situ synthetic resin casting 20 provided in a casing pipe 22, which has internal grooves 24 for ensuring a tight locking fit of the casting 20 thereto.

Prior to providing the casting 20, the discs 12 are tightly pulled together by means of tension wires or rods 26, which have looped ends 28 to ensure good gripping in the casting 20. These wires 26 extend through holes 30 (see FIG. 2) in the discs 12. (It is also possible that the wires or rods 26 extend on the outside of the discs 12 and are pulled tightly on the outside of the discs 12.)

In the casting 20 screw threaded sockets 32 are provided for receiving bolts 34 for attachment of a plate 36 which carries a flanged pipe 38. The pipe 38 is connected to the inlet or outlet tube of the device 10.

For assembly the procedure is as follows: the discs 12 are aligned and are stacked together so that their apertures 14 form elongated passages, the tubes 16 are inserted into the various passages defined by the apertures 14 in the discs 12, the wires 26 are passed through the holes 30 of the disc 12 and then the U-connectors 18 are fitted as shown in FIG. 1. Thereafter the wires 26 are pulled tight onto the two end discs 12.1 so as to tension the discs 12 tightly together. The pipe 22 is placed at the end of the device against the first disc 12.1. Then resin is cast into the tube 22 (while standing upright) to form a casting 20 to embed the end of the wires 26, together with the U-connectors 18 and the ends of the tubes 16, protruding from the end discs 12.1. The same procedure is applied at both ends of the device 10.

If required the device 10 thereafter is placed, together with other devices 10, into an outer housing 40 (see FIG. 4). The housing 40 has a discharge tube 42 for liquid passing through the walls of the tubes 16. Furthermore a liquid inlet 44 connected to the inlets of the various devices 10 located therein and a liquid outlet 46, connected to the outlets of the various devices 10, is provided.

The tube or sleeve 22 may be made of metal or plastics.

As an alternative, a sleeve 48, which may be screwthreaded on the outside, may be provided as shown in FIG. 1, to receive a tension wire or rod 50. This sleeve 48 allows the use of a non-load bearing outer sleeve in high pressure applications.

A typical device 10 would contain six high tensile stainless steel wires 26, diameter in the order of 1.5 to 2 mm.

The devices 10 normally are mounted at a slight angle to the horizontal, to allow permeate to run to one end and be collected in a drip tray. In some cases a number of devices 10 will be mounted inside a housing 40 and permeate is collected on the floor thereof.

If the discs 12 are pulled tightly together so that they are substantially sealed off by means of the ridges 19 fitting into the grooves 19.1 (see FIG. 3), then the permeate may be withdrawn through one of the holes 30 in which no tension wire or rod is placed.

Referring to FIG. 5 the same reference numerals will be used to indicate the same parts as in FIG. 1.

In this example the device 10.1 includes a number of tension bars 52, 53 (only three are shown but any number can be distributed uniformly over the cross-sectional area or along the circumference of the device 10). The bars 52 are longer than the bars 53, but otherwise the bars 52, 53 are similar.

The tension bars 52, 53 extend through holes 54 in the discs 12. These holes 54 are similar to the holes 30 illustrated in FIG. 2. The bars 52, 53 are screw-threaded in the region indicated by reference numeral 56 so as to receive nuts 58, which are turned on the threaded parts 56 for pulling the discs 12 tightly together from opposite ends.

The free ends 60 of the longer tension bars 52 project out of the resin casting 20 and pass through a hole 64 in the plate 62 so that a nut 66 can be turned thereon for holding the plate 62 in position. The plate 62 abuts against a collar 67, which presses via a resilient ring 67.1 against the outer end of the casting 20.

The plate 62 supports the tube 38, which is connected by way of the tube 68 to the inlet or outlet end of one of the membrane tubes 16.

Figure 7:
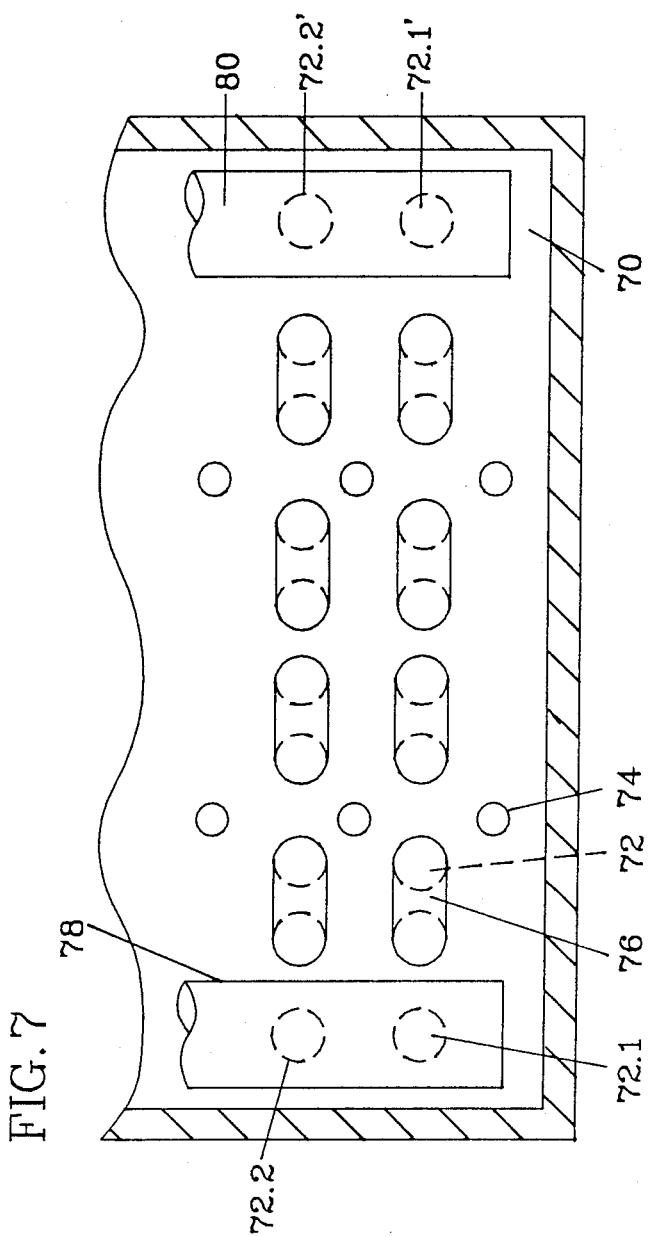
FIG. 7 an end view seen along arrow VII in FIG. 6.

Referring to FIGS. 6 and 7 one embodiment of a manifold connection is shown.

Here rectangular discs 70 (in place of the round discs 12 of FIGS. 1 to 5) are provided having apertures for receiving the membrane tubes 72. These discs 70 also have holes 74 for receiving the tension rods (details of which are not shown). The ends of the tubes 72 are connected by U-connectors 76, which are equivalent to the U-connectors 18 of FIG. 1.

As is shown, two rows of series connected tubes 72 are provided and these rows are connected in parallel. The first tube 72.1, 72.2, etc. of each row of tubes is joined to a manifold tube 78. Similarly the last tube 72.1', 72.2', etc. is connected to the manifold tube 80. Any number of rows of tubes can be connected thus.

Figure 8:
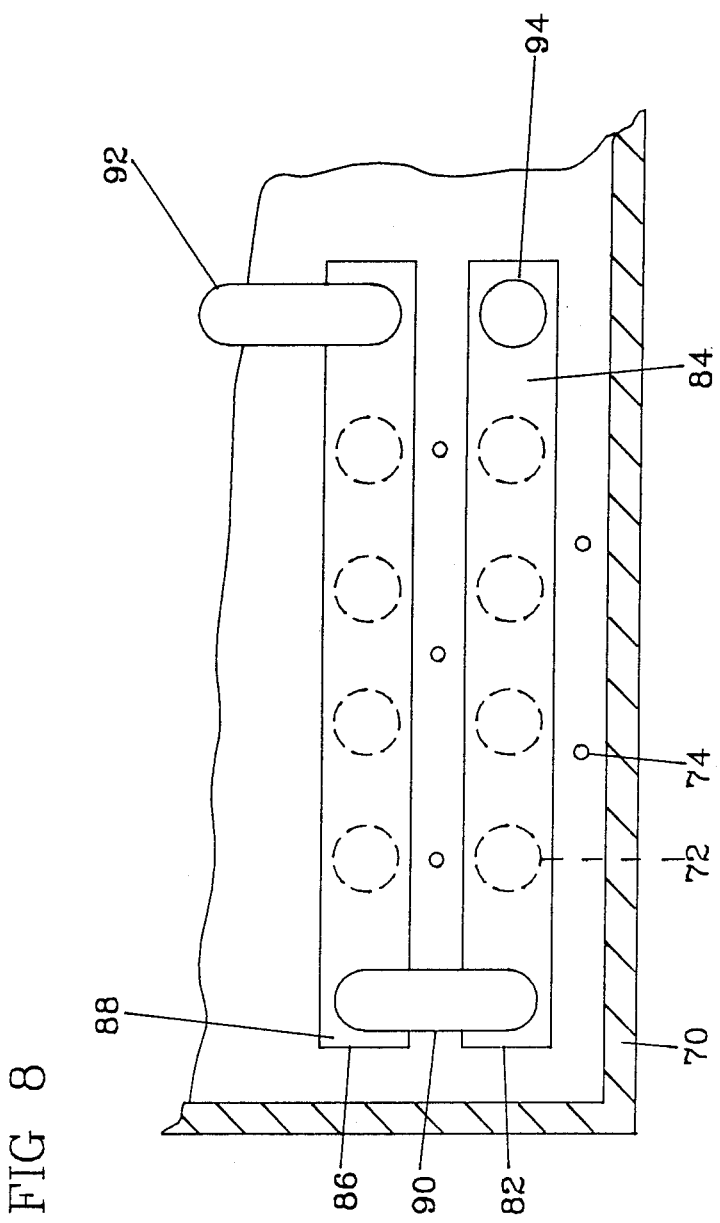
FIG. 8 an end view corresponding to FIG. 7 but showing another type of connection for a liquid flow device in accordance with the invention.

FIG. 8 is similar to FIG. 7 and the same reference numerals will be used to indicate similar components. Here the tubes 72 in a first row 82 are all connected in parallel to a manifold tube 84 and the tubes 72 in a second row 86 are connected to a manifold tube 88. The manifold tubes 82 and 88 are joined by a connector tube 90. The manifold tube 88 is connected by means of a connector tube 92 to the next manifold tube connected to the next row of membrane tubes, etc.

The first manifold tube 82 is connected to a liquid inlet tube 94 and the last manifold tube (not shown) in turn would be connected to a liquid outflow tube. Therefore the groups of parallel-coupled tubes are series coupled.

I claim:
1. A liquid flow device, which comprises:
 (a) a stack of discs having apertures, which are in alignment so as to define a plurality of elongated passages;
 (b) an end disc provided at each end of the stack of discs, each end disc having apertures which respectively are in alignment with the elongated passages of the stack of discs;
 (c) a membrane tube having a membrane wall provided in each elongated passage and projecting at opposite open ends through and beyond the end discs;
 (d) a liquid inlet to feed liquid into the interior of at least one membrane tube;

(e) a liquid outlet for withdrawing liquid from inside the membrane tubes;

(f) separating means separating the discs from each other so as to provide a flow gap between adjacent discs for allowing liquid, which has passed through the membrane wall of the membrane tubes, to flow out between the discs;

(h) tubular interconnector members provided at both open ends of at least two of the membrane tubes for interconnecting the open ends of membrane tubes at both ends so as to allow series flow to take place from the open end of one membrane tube into the end of at least one other membrane tube at the ends via the tubular interconnector members;

(i) at least one elongated tension member extending parallel to the elongated passages defined by the stack of discs; and (j) means for attaching each tension member to the discs, said attaching means cooperating with each elongated tension member for acting onto the end discs for forcing all discs between the end discs tightly together without the provision of an outer housing.

2. A device as claimed in claim 1, in which the discs have openings arranged in alignment so as to define a number of elongated passages, each of which passages receiving a tension member.

3. A device as claimed in claim 1, in which each tension member is in the form of a rod and the attachment means includes at least one screw threaded end on the rod onto which a nut is turned for forcing the discs together.

4. A device as claimed in claim 1, in which at least one membrane tube has one end connected to the liquid inlet and at least one other membrane tube has at least one end connected to the liquid outlet, and the remaining ends of the membrane tubes at each end being interconnected by tubular interconnector members.

5. A device as claimed in claim 4, in which the interconnector members are in the form of U-shaped tubular members.

6. A device as claimed in claim 4, in which a tubular casing is provided at each end of the membrane tubes and an in-situ cast resin casting is provided in each tubular casing to embed the ends of the membrane tubes and the interconnector members.

7. A device as claimed in claim 1, which includes (a) a tubular casing provided at each end of the membrane tubes;

(b) a resin casting provided in situ in each casing at each end of the membrane tubes and extending from the respective end disc to encapsulate and seal both the tubular interconnector members and the exposed surfaces of the ends of the membrane tubes extending beyond the end disc and associated with the tubular interconnector members so as to maintain the tubular interconnector members in fluidtight relationship with the interconnected ends of the membrane tubes, and so as to seal the tubular interconnector members in fluidtight relationship relative to the stack of discs and the membrane tubes in the casing; and (c) locking means for firmly locking each resin casting in place relative to its tubular casing.

* * * * *